Oct. 23, 1951 J. S. WOJCIK 2,572,553
CONTROL MECHANISM
Filed April 13, 1948 3 Sheets-Sheet 1

WITNESSES:

INVENTOR
JOSEPH S. WOJCIK
BY
ATTORNEY

Oct. 23, 1951  J. S. WOJCIK  2,572,553
CONTROL MECHANISM
Filed April 13, 1948  3 Sheets-Sheet 2

INVENTOR
JOSEPH S. WOJCIK
BY R. J. Eisinger
ATTORNEY

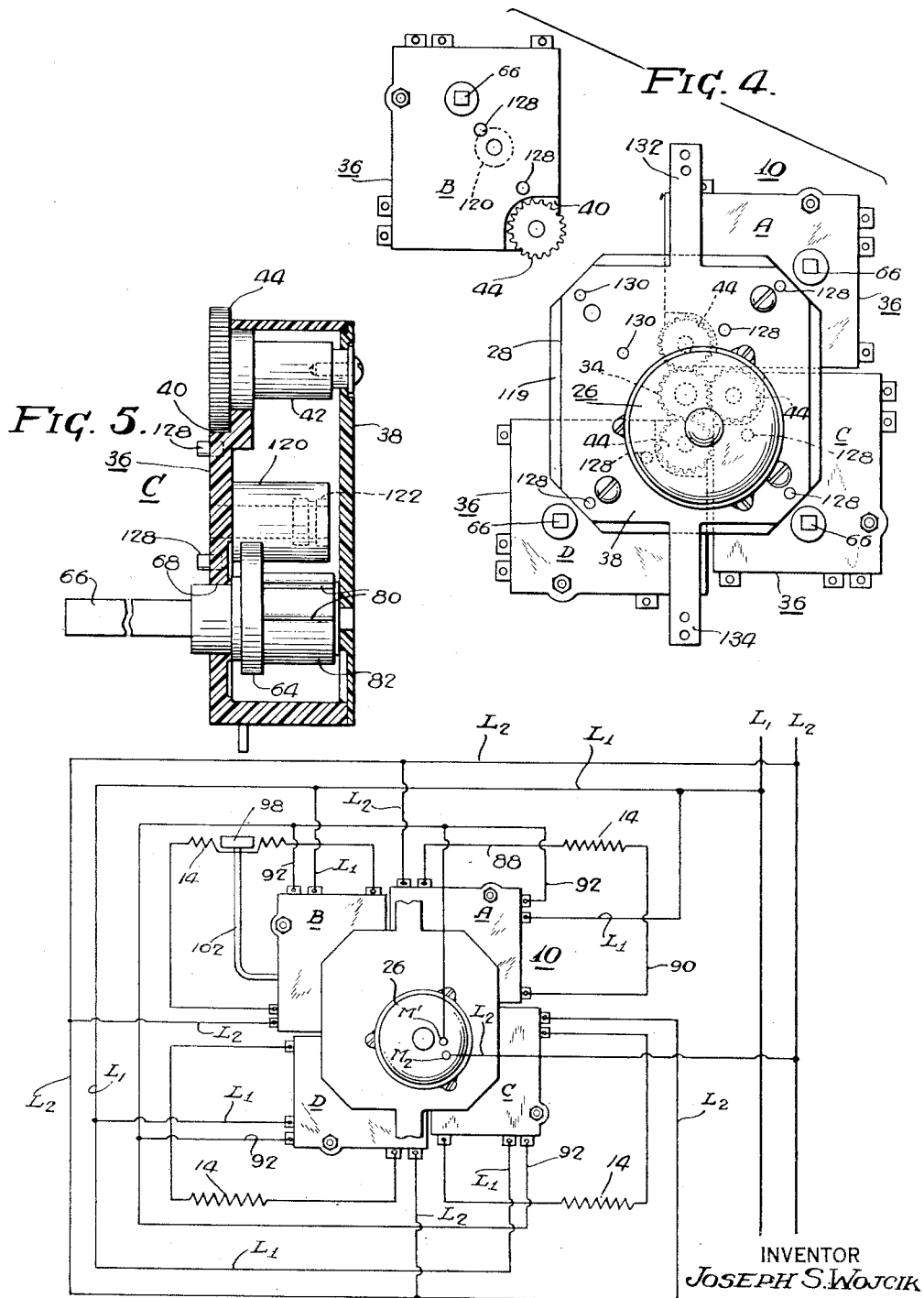

Patented Oct. 23, 1951

2,572,553

UNITED STATES PATENT OFFICE 2,572,553

CONTROL MECHANISM

Joseph S. Wojcik, Mansfield, Ohio, assignor to Westinghouse Electric Corporation, East Pittsburgh, Pa., a corporation of Pennsylvania Application April 13, 1948, Serial No. 20,770

1 Claim. (Cl. 200—27)

My invention relates to a control for an electric heating element, more particularly to the type known as infinite control, in which the current is periodically interrupted for an adjustable period to vary the average wattage delivered to the heating element. Such controls are particularly suitably for the surface units of an electric range.

In a known arrangement of such controls, a plurality of control units are combined in one complete housing and are actuated by a single cam which is continuously rotated by a suitable motor. Thus, the control units are integrated into one inseparable multiple control. Damage in manufacturing may mean disassembly of the entire multiple control for repair, while failure of a unit in the field will entail replacement of the entire multiple control.

There has been proposed a scheme wherein a plurality of separately housed control units can be removably mounted to a support structure for joint operation by a common motor-driven cam. In case of failure, the inoperative unit may be serviced without disturbing the other units.

In the above scheme a common cam is used to operate the plurality of switch units; thus it is necessary that each switch be calibrated to the same cam. While this is no problem at the factory, servicing a unit in the field will necessitate calibration of the replacement unit to the cam. In view of this, it is an object of my invention to provide means for individual factory calibration of the single units to eliminate need for calibration in the field and to simplify servicing problems.

It is a further object of my invention to provide a versatile multiple switch control in which each switch is completely independent in its operating cycle.

The present invention comprises a suitable mounting plate which supports a cycling motor and a plurality of individually house control switch units. In keeping with the above-mentioned objects, each switch possesses its own cycling cam, set and adjusted at the factory and adapted to be driven by a gear which is attached to the cam shaft and which in turn is driven by a pinion driven by the cycling motor shaft. The use of separate cams provides a multiple switch control having cams of diversified characteristics and a wide new scope of application. Also, any single switch unit may be removed for repair or replacement without affecting the other switch units.

In the accompanying drawings,

Fig. 4 is a front elevational view of the control with the switch knobs omitted and one unit removed to show the manner of assembly;

Fig. 5 is a cross section taken on line V—V of Fig. 2 with parts omitted for clarity; and Fig. 6 is a schematic wiring diagram showing electrical connections to the multiple control.

Figure 1:
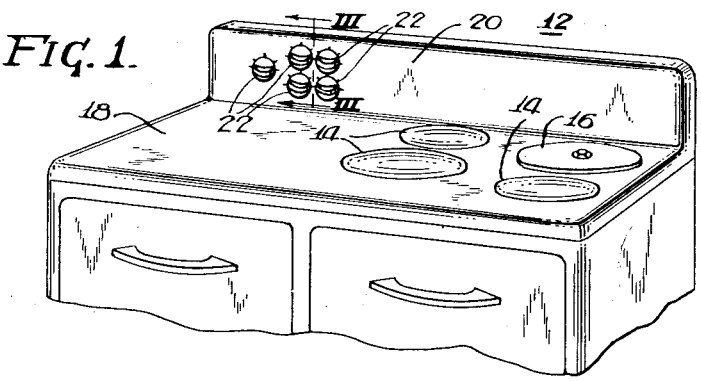
Fig. 1 is a partial perspective view of an electric range showing the control switches and the surface heating units they control.

Referring to the drawings in detail, the improved multiple control generally designated 10 (Fig. 2) is shown incorporated in an electric range 12 (Fig. 1) having a plurality of surface heating units 14 and a deep well cooker 16 disposed in a platform 18. Although the multiple control may be placed in any location on the range, I have shown it mounted behind a backsplasher panel 20 as evidenced by a plurality of control knobs 22 mounted thereon.

The multiple control 10 may comprise any number of individual control units as determined by the number of surface heating units 14 or deep well cookers 16 built into the range, but I have shown four individual control units at stations A, B, C and D to control the three surface heating units and the deep well cooker. Since the individual control units function primarily in the same way, only the control unit at station A and the control unit at station B showing a variation of A will be described in detail.

In infinite wattage control switch mechanisms, the principle of operation is that the wattage delivered by a heating unit in an intermittently operating circuit varies directly with the length of the "on" cycle with respect to the "off" cycle. Thus, if the contacts are "on" continuously the heating unit delivers 100% of its wattage rating, while if the contacts are "on" 50% of the time the heating unit delivers 50% wattage, etc. The intermittent operation of the contacts is accomplished by a cam rotated by a continuously rotating constant speed motor while the length of the "on" period is adjustable.

An electric motor 26 having a constant speed characteristic is mounted in a central location on a mounting plate 28 with its output shaft 30 extending through an opening in the mounting plate. A pinion 34 is attached to the shaft 30 and constitutes the power take-off for actuating the control units A, B, C and D which are also mounted to plate 28 as will be described later. Each control unit is encased in a housing 36, having, as shown in connection with station C in Fig. 5, a cover plate 38, substantially rectangular in shape and having an opening 40 adjacent the motor pinion 34. Disposed in this opening is a rotatably mounted cycling cam 42 and a gear 44 in fixed relation with each other. Gear 44 meshes with motor pinion 34 and rotates the cycling cam at a fixed rate of speed.

A manually adjustable contact 46 (Fig. 2) carried by a flexible current carrying member 48 is in alignment with a cycling contact 50 carried by a flexible current carrying member 52 having a bent portion 54 at its free extremity. This bent portion is biased against the cycling cam 42 and acts as a cam follower allowing the cycling contact 50 to intermittently make and break an electrical circuit through the manually adjustable contact 46.

The switch knob 22 controls the setting of manually adjustable contact 46 as will now be described. A bell crank 56 pivoted at 58 has one arm 60 underlying and abutting the manually adjustable contact 46 while its other arm 62 acts as a cam follower by having its free end disposed on the surface of a cam 64 having a gradually rising surface. The cam 64 is carried by a shaft 66 which is journaled at 68 in the housing 36 and extends through an opening in the backsplasher panel 20 into the switch knob 22. It may now be seen that by rotating the knob 22 the cam 64 will move the bell crank 56, causing the arm 60 to move the adjustable contact 46 with respect to the cycling contact 50. When contact 46 is brought nearer contact 50, the "on" period is increased and conversely, when the contact 46 is moved farther away from contact 50, the "off" period is increased. The adjustable contact 46 may be set to an infinite number of positions by the bell crank 56 as determined by the setting of the cam 64.

Although the motor 26 may be controlled by means of any type of switch device, it is shown as being controlled by a pair of movable electrical contacts 70 and 72 which cooperate with a pair of stationary contacts 74 and 76 carried by the housing 36. The movable contacts are carried by a flexible current carrying arm 78 having an indented portion 80. This indent 80 abuts the surface of a cam 82 which is carried by the knob shaft 66. On the periphery of the cam is a notch 84 which cooperates with indent 80 when the switch knob is in the "off" position to break the circuit between contacts 70 and 74 and contacts 72 and 76, respectively. However, when the switch knob 22 is in any "on" position the indent is moved to the right by the cam 82 causing the contacts 70 and 74 and contacts 72 and 76 to make circuits which will energize the cycling motor and the heating unit 14 simultaneously.

A pair of electrical conductors $L_1$ and $L_2$ are connected to stationary contact 74 and to the adjustable contact carrying member 48, respectively. One of the surface heating units 14 (shown schematically in this instance since it will be described subsequently in conjunction with station B) is connected by leads 88 and 90 to the cycling contact carrying member 52 and flexible member 78, respectively. The motor has a terminal $M_1$ which is connected by a lead 92 to contact 76. A second motor terminal $M_2$ is connected to $L_2$.

Figure 2:
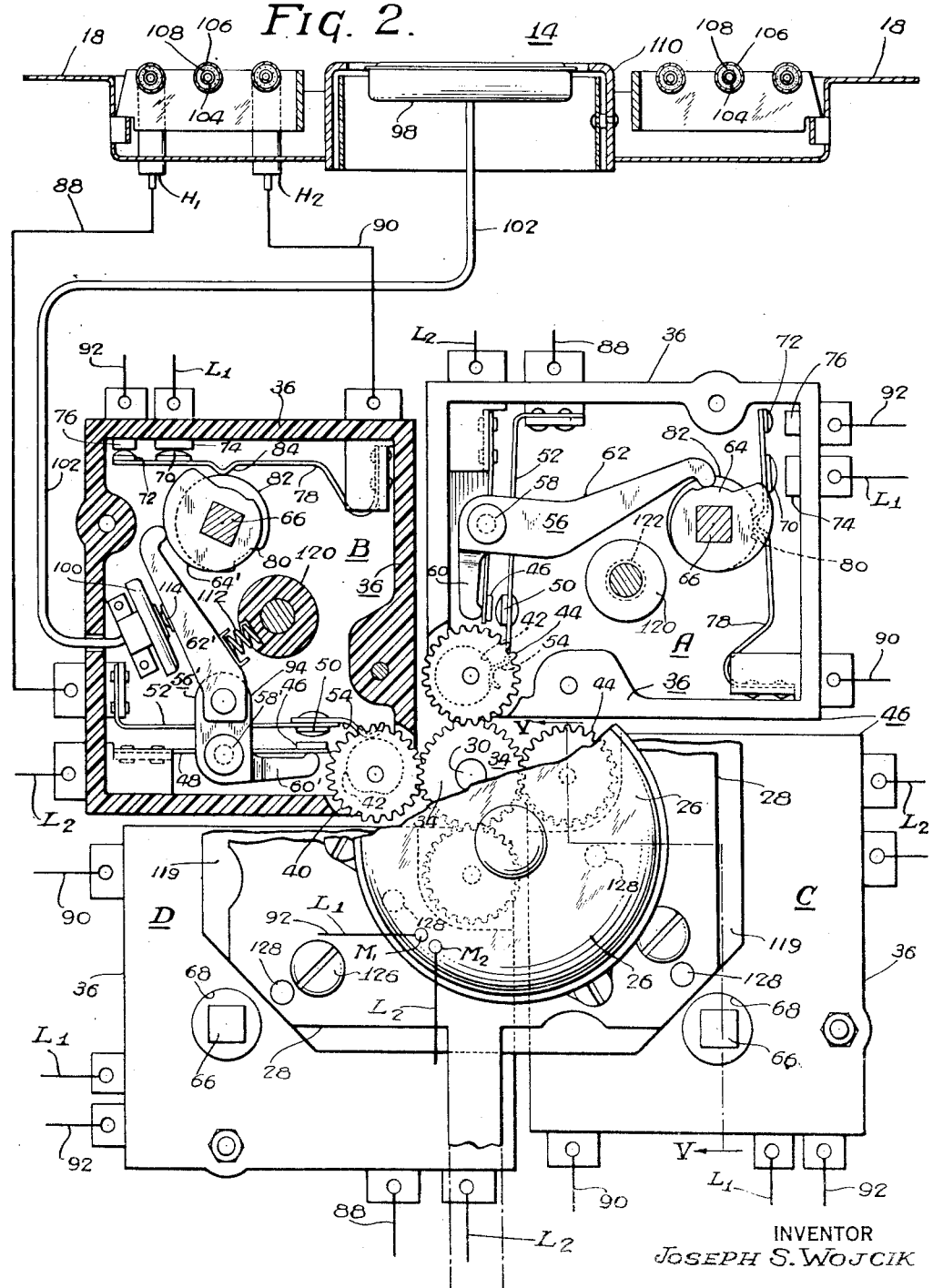
Fig. 2 is a front view of the multiple control with a portion in section.

When the switch knob 22 is rotated to an "on" position, the following circuits are attained as shown in Figs. 2 and 6. Current will flow from $L_1$ through contacts 74 and 70, flexible member 78, conductor 90, heating unit 14, conductor 88, flexible member 52, contacts 50 and 46 when closed, flexible member 48 to $L_2$, thus completing the heating unit circuit. Another circuit will be made simultaneously from $L_1$, through contacts 74 and 70, contacts 72 and 76, conductor 92, motor terminal $M_1$, through the motor 26, motor terminal $M_2$, to $L_2$, thus completing the motor circuit and allowing cam 42 to cycle contact 50. When the switch knob is returned to its "off" position, the contact arm 78 will move to the left disengaging the contacts 70 and 74 and 72 and 76, breaking the motor circuit and opening the circuit to heating unit 14. Also the adjustable contact 46 will move to the left beyond the limit of travel of contact 50, opening the other side of the heating unit circuit.

The control unit at station B will now be described. As previously stated, this control unit is similar to the control unit at station A except this unit has thermostatic control. The adjustable contact 46 is operable by a bell crank 56' which is pivoted at 58' and has a lower leg 60' underlying and engaging the adjustable contact arm 48. The other leg 94 of the bell crank 56' is pivoted at a cam follower lever 62' which has its free end bearing on the surface of a cam 64'. A hydraulic thermostat having a chamber 98 commonly called a bulb, has a diaphragm or wafer 100 disposed within the control unit housing 36 adjacent the cam follower lever 62'. This bulb 98 is filled with a heat expansible liquid and communicates with the wafer 100 by means of a tube 102. As is well known in the art, any expansion of the liquid within the bulb 98 will cause the wafer 100 to expand proportionately. Conversely, any contraction of the liquid will cause a proportionate contraction of the wafer.

The surface heating unit 14 as shown in Fig. 2 is of the conventional sheathed single element type used in conjunction with infinite wattage controls and comprises an electrical resistance element 104 centrally located in a sheath 106 and spaced therefrom by an insulating material 108. The sheathed element is bent into spiral form to provide a grid capable of supporting a cooking vessel or the like. The heating unit is disposed in an opening of the range platform 18 and supported therein. Within the center of the heating unit 14, protected from direct heat of the resistance element 104 by a cylindrical metallic heat baffle 110 is disposed the thermostat bulb 98 as described above. The heating unit has the ends of its resistance element 104 attached to a pair of terminals $H_1$ and $H_2$ by which it is connected into the electrical circuit.

The electrical circuits attained at station B are identical with those attained at station A; however, the position of the adjustable contact 46 moves in response to the action of the thermostat to provide a longer "on" period for the heating unit when the thermostat bulb 98 is cool, and a shorter "on" period when the bulb is heated by a cooking vessel as its contents attain cooking temperature. This automatic adjustment of contact 46 is attained by the movement of the cam follower lever 62' which is moved clockwise by a spring 112 until a projection 114 carried by the follower lever abuts the thermostat wafer 100 and the upper end of the lever abuts cam 64'. It is now seen that while the adjustable cam 64 is set to maintain the desired temperature of the vessel, as long as the cooking vessel's contents are below cooking temperature the wafer will be in a contracted position allowing the cam follower arm 62' to move clockwise due to the bias of the spring 112, thus rotating the bell crank 56' counterclockwise and causing it to raise the contact 46 towards the cycling contact 50 to provide a longer "on" period. This "on" period may vary from 100% or "full on" with contacts 46 and 50 in continuous engagement at the initiation of a cooking cycle, to the "on" position required to maintain the temperature preselected by the control knob 22, as the vessel heats to cooking temperature and correspondingly heats the thermostat.

Figure 3:
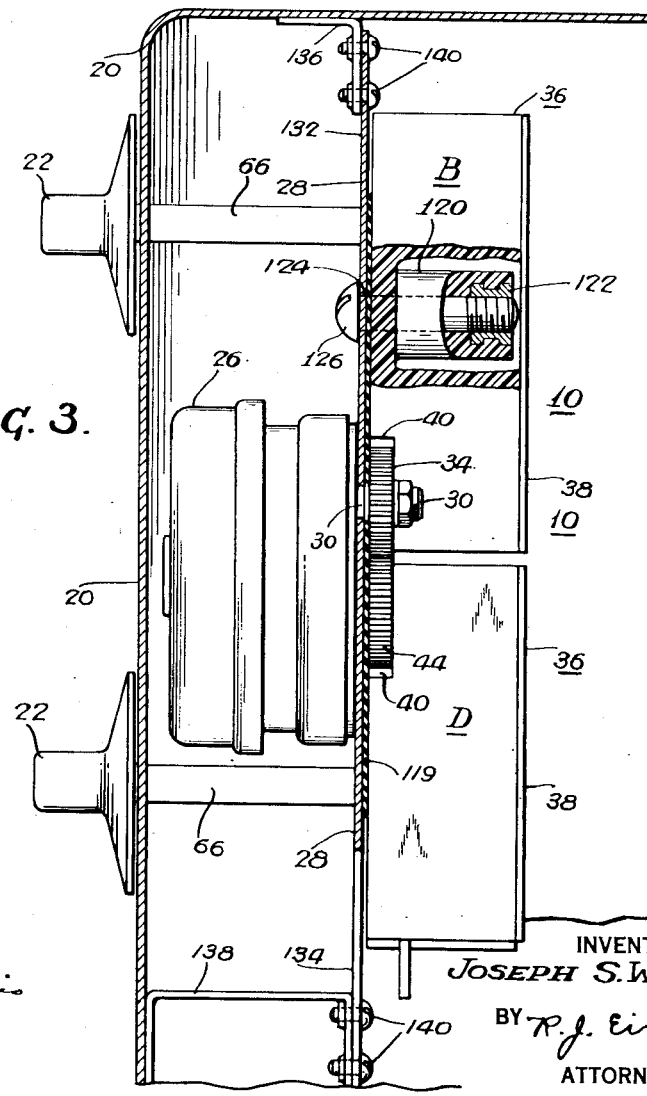
Fig. 3 is a section taken on line III—III of Fig. 1 showing a side view of the multiple control.

The control units at stations A, B, C and D are attached to the mounting bracket 28 on the side opposite the motor and in symmetrical relationship therewith. A sheet of mica 119 or other well-known electrical material may be interposed between the control unit housing 36 and the mounting bracket 28 for added protection against short circuiting. As best shown in Fig. 3, the individual control unit housing is provided with an internally disposed boss 120 having a female threaded insert 122. The bracket has an opening 124 through which a screw 126 is received for engaging the threaded insert 122, thereby rigidly securing the control unit to the mounting plate 28. However, to insure proper positioning of the unit on the mounting plate and to prevent its turning when the knob 22 is rotated, the housing 36 is provided with dowel pins 128 which are adapted to enter mating holes 130 in the mounting plate. Thus, it will be seen that the control unit is detachably yet securely fastened to the mounting plate in proper relationship with the motor pinion 34.

The mounting plate 28 may be attached to the range backsplasher panel 20 in various ways, but I have shown the mounting plate as having an upstanding arm 132 and a pendant arm 134. The backsplasher has an L-shaped bracket 136 in its upper portion and an inverted U-shaped bracket 138 in its lower portion which are attached to the bracket arms 132 and 134, respectively, by means of screws 140. The control unit shaft 66 extends through an opening in the backsplasher 20 and extends forwardly therefrom to provide a mounting for the control knob 22.

To remove a damaged control unit from the range 12, the knobs 22 are first removed from the control shafts 66. The entire multiple control 10 is detached from the backsplasher panel 20 by removing the screws 140 and withdrawing it to the right as shown in Fig. 3, thus disengaging the shafts 66 from the blacksplasher. The control unit to be replaced is then detached from the mounting plate 28 by removing the screw 126 and disconnecting conductors L1, L2, 88, 90 and 92. The multiple control unit 10 will then appear as shown in Fig. 4.

To install a new control unit the above procedure is reversed. No adjustments are necessary, since all calibration adjustments such as cam settings and contact adjustments have been made at the factory. In installing a new control unit the dowel pins carried by the unit are inserted through the openings 130 in the mounting plate 28. It is thus positively positioned for proper cooperative relationship between the unit driven gear 44 and the motor pinion 34 eliminating any binding or friction which would ordinarily be caused by misalignment of the gear and pinion.

In replacing a control unit it is not necessary that the same type be substituted. A temperature-responsive unit of the type shown at station B may be used to replace a unit of the type shown at station A, if desired, provided that the thermostat bulb 98 is properly positioned in the surface heating unit 14. Also a control unit of the type shown at station A may be used to replace a temperature-responsive unit of the type shown at B.

While I have shown my invention in but one form, it will be obvious to those skilled in the art that it is not so limited, but is susceptible of various changes and modifications without departing from the spirit thereof.

What I claim is:

An electric range control comprising a mounting plate, a motor mounted on one side of said plate and a plurality of switch mechanisms removably mounted on the other side of said plate; each of said switches having a pair of intermittently operating electrical contacts, an individual actuating cam adapted to intermittently open and close said contacts and a gear for driving said cam, said gear and said cam being mounted for rotation about a common axis in fixed relation with each other, each of said switches being unitary and having an individual housing, said housing having an opening therein adjacent said plate and said gear being disposed in said opening; said motor having a driving pinion centrally disposed with respect to said switch mechanisms and in driving engagement with said gears.

JOSEPH S. WOJCIK.

REFERENCES CITED

The following references are of record in the file of this patent:

UNITED STATES PATENTS

| Number | Name | Date |
| --- | --- | --- |
| 1,114,788 | Mercer | Oct. 27, 1914 |
| 1,650,924 | Aalborg et al. | Nov. 29, 1927 |
| 1,942,306 | Price | Jan. 2, 1934 |
| 2,294,573 | Potter | Sept. 1, 1942 |
| 2,424,116 | Puerner | July 15, 1947 |